US012723654B2

(12) United States Patent
Takahashi et al.

(10) Patent No.: US 12,723,654 B2
(45) Date of Patent: Sep. 1, 2026

(54) PISTON RING

(71) Applicant: KABUSHIKI KAISHA RIKEN, Tokyo (JP)

(72) Inventors: Junya Takahashi, Kashiwazaki (JP); Keiji Honda, Kashiwazaki (JP)

( * ) Notice: Subject to any disclaimer, the term of this patent is extended or adjusted under 35 U.S.C. 154(b) by 0 days.

(21) Appl. No.: 18/867,808

(22) PCT Filed: Aug. 29, 2023

(86) PCT No.: PCT/JP2023/031339

§ 371 (c)(1), (2) Date: Jan. 14, 2025

(87) PCT Pub. No.: WO2025/046758

PCT Pub. Date: Mar. 6, 2025

(65) Prior Publication Data

US 2025/0129847 A1 Apr. 24, 2025

(51) Int. Cl.
*F16J 9/26* (2006.01)

(52) U.S. Cl.
CPC .................................. *F16J 9/26* (2013.01)

(58) Field of Classification Search
CPC ................................................. F16J 9/26
See application file for complete search history.

(56) References Cited

U.S. PATENT DOCUMENTS 4,344,634 A 8/1982 Onozaki
10,295,058 B2 * 5/2019 Sato ......................... F02F 5/00
2005/0218603 A1 10/2005 Fischer
2008/0007006 A1 * 1/2008 Kawai ........................ F16J 9/26 277/310
2013/0075977 A1 3/2013 An
2014/0137733 A1 5/2014 Sekiya et al.
2015/0136062 A1 * 5/2015 Tsuji ........................ F16J 10/04 123/193.4
2015/0292622 A1 * 10/2015 Kennedy .................... F16J 9/26 277/442
2015/0300493 A1 * 10/2015 Kunimoto ............... C23C 16/26 123/193.2
2016/0215882 A1 * 7/2016 Shima ..................... C22C 38/24
2016/0238132 A1 8/2016 Sato et al.
2016/0305547 A1 10/2016 Avelar Araujo et al.
2018/0080556 A1 3/2018 Sato et al.
2018/0180182 A1 * 6/2018 Ozaki ....................... F02F 5/00

(Continued)

FOREIGN PATENT DOCUMENTS

CN 105593581 5/2016
DE 10214062 A1 * 10/2002 ................ F16J 9/26

(Continued)

OTHER PUBLICATIONS

International Search Report dated Oct. 3, 2023 for PCT/JP2023/031339 and its English translation.

(Continued)

*Primary Examiner* — Eugene G Byrd
(74) *Attorney, Agent, or Firm* — SHIPWAY IP

(57) ABSTRACT

A piston ring including: a piston ring base material having a joint portion; and a coating covering at least an outer peripheral surface of the piston ring base material, the coating having a thermal resistance value of $2.0\times10^{-6}$ to $12.0\times10^{-6}$ $m^2\cdot K/W$.

13 Claims, 4 Drawing Sheets

(56) References Cited

U.S. PATENT DOCUMENTS

| | | | | |
|---|---|---|---|---|
| 2020/0217416 | A1* | 7/2020 | Okazaki | C23C 14/0605 |
| 2020/0299812 | A1* | 9/2020 | Chida | C23C 14/025 |
| 2022/0396746 | A1* | 12/2022 | Okazaki | C01B 32/05 |
| 2023/0083774 | A1 | 3/2023 | Saito et al. | |
| 2023/0392687 | A1* | 12/2023 | Sato | C01B 32/25 |

FOREIGN PATENT DOCUMENTS

| | | | | |
|---|---|---|---|---|
| EP | 1476587 | | 5/2006 | |
| EP | 4350035 | | 4/2024 | |
| JP | S56-081243 | | 7/1981 | |
| JP | H5-223172 | | 8/1993 | |
| JP | H6-248425 | | 9/1994 | |
| JP | 2001-335878 | | 12/2001 | |
| JP | 2003113941 | A * | 4/2003 | F16J 9/26 |
| JP | 2013-029190 | | 2/2013 | |
| JP | 2016-169798 | | 9/2016 | |
| JP | 2017-057897 | | 3/2017 | |
| JP | 2017-227274 | | 12/2017 | |
| JP | 2022-087131 | | 6/2022 | |
| JP | 7093899 | | 6/2022 | |
| WO | 03/070999 | | 8/2003 | |
| WO | 2015/046427 | | 4/2015 | |
| WO | 2021/153425 | | 8/2021 | |
| WO | 2022/131057 | | 6/2022 | |

OTHER PUBLICATIONS

Extended Search Report in corresponding European Application No. 23937791.4, dated Sep. 19, 2025.

International Preliminary Report on Patentability with Written Opinion dated Mar. 12, 2026 for PCT/JP2023/031339.

* cited by examiner

PISTON RING

CROSS-REFERENCE TO RELATED APPLICATIONS

This application is a 35 U.S.C. § 371 national phase application of PCT Application No. PCT/JP2023/031339, filed on Aug. 29, 2023.

TECHNICAL FIELD

The present disclosure relates to a piston ring.

BACKGROUND ART

In recent years, awareness of the global environment has been increasing, and low fuel consumption and low emission are strongly required in engines. In order to improve combustion efficiency, a higher compression ratio and a higher load of engine specifications have become a trend. An accompanying temperature rise of a combustion chamber causes heat deformation of a piston ring, and as a result, tension of the piston ring decreases so that sealing performance decreases. As a means for solving this problem, Patent Literature 1 discloses a piston ring obtained by replacing conventional spring steel or carbon steel with chromium-based stainless steel having more excellent heat resistance.

CITATION LIST

Patent Literature

Patent Literature 1: Japanese Unexamined Patent Publication No. S56-81243

SUMMARY OF INVENTION

Technical Problem

According to studies of the present inventors, it has been found that the amount of blow-by gas, which is one type of emission, may increase even under a condition in which heat deformation does not occur in a piston ring made of chromium-based stainless steel. The present disclosure provides a piston ring advantageous in sufficiently reducing the amount of blow-by gas.

Solution to Problem

The present inventors have focused on the fact that the amount of blow-by gas and fuel consumption vary depending on a material forming an outer peripheral surface of a piston ring. As a result of repeating experiments while changing a material and a thickness of a coating, it has been found that a thermal resistance value of the coating correlates with the fuel consumption and the blow-by gas, that is, the amount of blow-by gas can be sufficiently reduced when the thermal resistance value of the coating is within a predetermined range. Note that the thermal resistance value is a value represented by the following Formula 1, and the thermal resistance value and thermal conductivity have a relationship represented by the following Formula 2.

$$\text{Thermal resistance value} = \text{Film thickness}/(\text{Specific gravity} \times \text{Specific heat} \times \text{Thermal diffusivity}) \quad \text{(Formula 1)}$$

-continued $$\text{Thermal resistance value} = \text{Film thickness}/\text{Thermal conductivity} \quad \text{(Formula 2)}$$

One aspect of the present disclosure relates to a piston ring including a coating. That is, the piston ring according to the present disclosure includes a piston ring base material having a joint portion and the coating covering at least an outer peripheral surface of the piston ring base material, the coating having a thermal resistance value of $2.0\times10^{-6}$ to $12.0\times10^{-6}$ m$^2$·K/W.

According to the piston ring, the amount of blow-by gas can be sufficiently reduced. The present inventors presume the main cause thereof as follows. That is, the temperature of the piston ring rises with the operation of an engine, and accordingly, the piston ring moderately expands to narrow a gap at the joint portion of the piston ring. When the thermal resistance value of the coating is $2.0\times10^{-6}$ m$^2$·K/W or more, the piston ring base material is heated by heat from a piston, but heat dissipation to a cylinder liner is suppressed, so that the gap at the joint portion of the piston ring is sufficiently narrowed by thermal expansion, and the amount of blow-by gas can be suppressed. On the other hand, when the thermal resistance value of the coating is $12.0\times10^{-6}$ m$^2$·K/W or less, it is possible to suppress an excessive rise of the temperature of the piston ring base material, and it is possible to prevent heat deformation of the piston ring which causes an increase in the amount of blow-by gas.

Advantageous Effects of Invention

According to the present disclosure, the piston ring advantageous in sufficiently reducing the amount of blow-by gas is provided.

DESCRIPTION OF EMBODIMENTS

Hereinafter, embodiments of the present disclosure will be described in detail with reference to the drawings. Note that the present invention is not limited to the following embodiments.

<Piston Ring>

Figure 1:
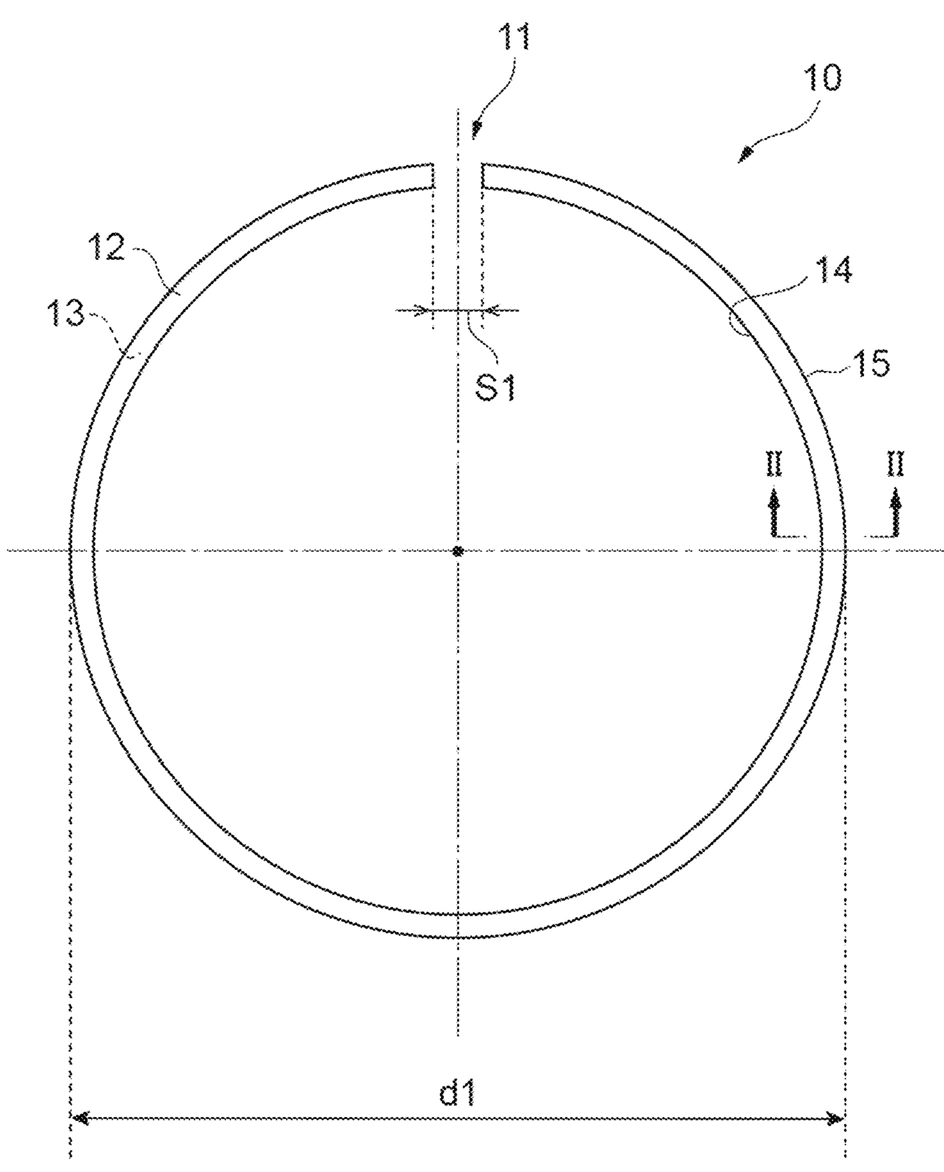
FIG. 1 is a plan view schematically illustrating one embodiment of a piston ring according to the present disclosure.
Figure 2:
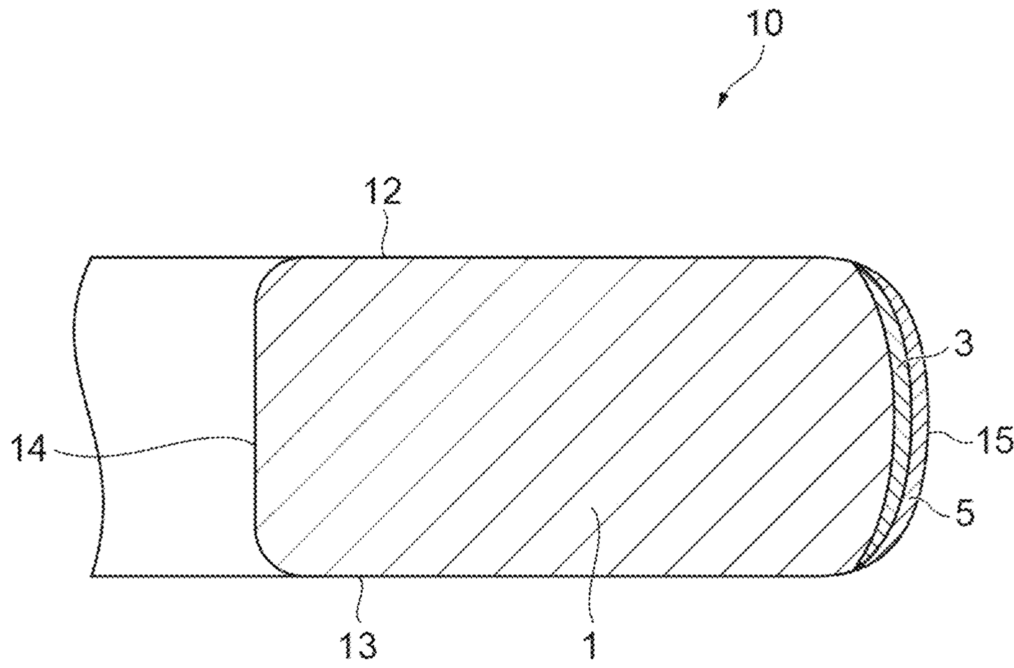
FIG. 2 is a cross-sectional view taken along line II-II illustrated in FIG. 1.

FIG. 1 is a plan view schematically illustrating a piston ring according to the present embodiment. FIG. 2 is a cross-sectional view taken along line II-II illustrated in FIG. 1. As illustrated in FIG. 1, a piston ring 10 has an annular shape and has a joint portion 11. The piston ring 10 has a pair of side surfaces 12 and 13, an inner peripheral surface 14, and an outer peripheral surface 15. The side surfaces 12 and 13 intersect the inner peripheral surface 14, and are, for example, substantially orthogonal to the inner peripheral surface 14. An outer diameter d1 of the piston ring 10 is, for example, 40 to 300 mm. A gap S1 of the joint portion 11 is, for example, 0.15 to 0.60 mm. The piston ring 10 may have a perfect circular shape or an elliptical shape in plan view.

As illustrated in FIG. 2, the piston ring 10 includes a piston ring base material 1 having the joint portion 11, a coating 5 forming the outer peripheral surface 15 of the piston ring 10, and an intermediate layer 3. The intermediate layer 3 is provided between the piston ring base material 1 and the coating 5, and for example, serves to enhance adhesion of the coating 5 to the piston ring base material 1. The piston ring 10 may have a substantially rectangular cross section, and the outer peripheral surface 15 of the piston ring 10 may be rounded and bulged outward. The outer peripheral surface 15 is a surface that slides with respect to an inner surface of a cylinder liner.

The piston ring 10 is a pressure ring for an internal combustion engine (for example, a high-load diesel engine or an automobile engine). The pressure ring is attached to, for example, a ring groove formed in a side surface of a piston. The pressure ring is exposed to an environment with a high thermal load of the engine. One of functions of the pressure ring is gas sealing. The pressure ring suppresses gas (blow-by gas) leaking from a combustion chamber side to a crank chamber side. An increase in the blow-by gas leads to deterioration of engine oil, deterioration of fuel consumption, an increase in environmental load, and the like. The joint portion of the piston ring is one of the blow-by gas leakage paths. From the viewpoint of blow-by gas suppression, the gap of the joint portion is desirably as small as possible when the engine is driven.

Another function of the pressure ring is cooling the piston by heat dissipation. The piston is heated by heat of the combustion chamber, and the heat of the piston is dissipated to the cylinder liner through the pressure ring. If the temperature of the piston rises too much, a piston material agglutinates and the fuel consumption of the engine significantly deteriorates. On the other hand, when the heat dissipation through the piston and the piston ring is excessive, the thermal efficiency of the engine deteriorates, leading to the deterioration of fuel consumption. Therefore, the thermal resistance of the piston ring is required to be within a predetermined range from the viewpoint of fuel consumption.

(Piston Ring Base Material)

The piston ring base material 1 is made of an alloy having heat resistance. Specific examples of the alloy include martensitic stainless steel typified by chromium-based stainless steel, tool steel, and heat-resistant steel. When the piston ring base material is made of martensitic stainless steel, heat deformation of the piston ring base material is suppressed, and the piston ring capable of maintaining good gas sealability even in the case of being used at a high temperature is achieved.

(Intermediate Layer)

As described above, the intermediate layer 3 serves to enhance the adhesion between the piston ring base material 1 and the coating 5. A thickness of the intermediate layer 3 is preferably 0.1 to 3.0 μm, and more preferably 0.5 to 2.5 μm. When the thickness of the intermediate layer 3 is 0.1 μm or more, an effect of improving the adhesion by mitigating the internal stress of each of the piston ring base material 1 and the coating 5 is exhibited. On the other hand, when the intermediate layer 3 is excessively thick, the effect of mitigating the internal stress is saturated, and a film formation cost tends to increase. Therefore, the thickness of the intermediate layer 3 is desirably 3.0 μm or less.

The intermediate layer 3 may be made of, for example, chromium or chromium containing Si, Al, or the like. When the intermediate layer 3 is made of chromium containing Si, the Si content of the intermediate layer 3 is preferably 2.0 to 10.0 at %. When the Si content is 2.0 at % or more, the thermal resistivity of the intermediate layer 3 increases, and the total thermal resistivity of the intermediate layer 3 and the coating 5 increases, so that an effect of further contributing to the suppression of the amount of blow-by gas is exhibited. On the other hand, when the Si content is 10.0 at % or less, an effect of maintaining the effect of mitigating the internal stress by the intermediate layer 3 is exhibited. A lower limit value of the Si content may be 2.5 at % or 3.0 at %. An upper limit value of the Si content may be 8.5 at % or 6.0 at %. When the intermediate layer 3 is made of chromium containing Al, the Al content of the intermediate layer 3 is preferably 10.0 to 50.0 at %. When the Al content is 10.0 at % or more, the thermal resistivity of the intermediate layer 3 increases, and the total thermal resistivity of the intermediate layer 3 and the coating 5 increases, so that an effect of further contributing to the suppression of the amount of blow-by gas is exhibited. On the other hand, when the Al content is 50.0 at % or less, an effect of maintaining the effect of mitigating the internal stress by the intermediate layer 3 is exhibited. A lower limit value of the Al content may be 13 at % or 15 at %. An upper limit value of the Al content may be 25 at % or 20 at %.

When the intermediate layer 3 is made of chromium containing Si, the coating 5 is preferably made of chromium nitride containing Si. Since the intermediate layer 3 and the coating 5 are formed using these materials, mutual diffusion occurs at an interface between the intermediate layer 3 and the coating 5, and adhesion between the intermediate layer 3 and the coating 5 is improved. As a result, even when the piston ring 10 is used in a severe environment, the effects of improving the fuel consumption and suppressing the amount of blow-by gas can be maintained for a sufficiently long period of time.

When the intermediate layer 3 is made of chromium containing Al, the coating 5 is preferably made of chromium nitride containing Al. Since the intermediate layer 3 and the coating 5 are formed using these materials, mutual diffusion occurs at an interface between the intermediate layer 3 and the coating 5, and adhesion between the intermediate layer 3 and the coating 5 is improved. As a result, even when the piston ring 10 is used in a severe environment, the effects of improving the fuel consumption and suppressing the amount of blow-by gas can be maintained for a sufficiently long period of time.

(Coating)

As described above, the coating 5 forms the outer peripheral surface 15 of the piston ring 10. A thickness of the coating 5 is preferably 3 to 100 μm, and more preferably 5 to 70 μm. When the thickness of the coating 5 is 3 μm or more, not only an effect of enhancing the durability of the coating 5 due to sliding contact between the outer peripheral surface 15 of the piston ring 10 and the cylinder liner is obtained, but also the effects of improving the fuel consumption and suppressing the amount of blow-by gas by increasing the thermal resistivity of the piston ring 10 are obtained. On the other hand, when the thickness of the coating 5 is 100 μm or less, an excessive rise of the temperature of the piston ring base material 1 can be suppressed, and thus, not only heat deformation of the piston ring 10 that causes an increase in the amount of blow-by gas can be prevented, but also an effect that high productivity can be secured is achieved.

The coating 5 is made of, for example, a metal nitride such as chromium nitride or titanium nitride, or an amorphous carbon film. The coating 5 may be a single layer or a laminate of two or more kinds of layers as long as a predetermined thermal resistance value is obtained as a whole. Examples of the laminate of two or more kinds of layers include a laminate of a chromium nitride layer and a chromium nitride layer containing carbon.

Since the surface (the outer peripheral surface 15) of the coating 5 is made of metal nitride or amorphous carbon, the progress of wear of the coating 5 can be suppressed, and the function of the coating 5 can be maintained for a sufficiently long period of time. The coating 5 may further contain Si, Al, C, H, or the like. When the coating 5 contains Si or Al, the blow-by gas can be more effectively suppressed.

When the coating 5 is made of chromium nitride containing Si, the Si content of the coating 5 is preferably 1.0 to 10.0 at %. Chromium nitride having the Si content of 1.0 at % or more consists of refined crystal grains, and has good crack resistance and peeling resistance. On the other hand, chromium nitride having the Si content of 10.0 at % or less is good to form an appropriate amorphous phase, and has good crack resistance. Therefore, the coating 5 made of chromium nitride containing Si within the above range can maintain the effects of improving the fuel consumption and suppressing the amount of blow-by gas even in a more severe use environment. Further, chromium nitride containing Si within the above range has excellent wear resistance. Therefore, when a sliding surface is made of this chromium nitride, the effects of improving the fuel consumption and suppressing the amount of blow-by gas can be maintained for a longer period. A lower limit value of the Si content may be 1.5 at % or 2.0 at %. An upper limit value of the Si content may be 8.0 at % or 6.0 at %.

When the coating 5 is made of chromium nitride containing Al, the Al content of the coating 5 is preferably 10 to 50 at %. When the Al content is 10 at % or more, the thermal conductivity of the material forming the coating 5 can be sufficiently reduced, and thermal insulation performance can be imparted to the coating 5. In addition, the wear resistance of the coating 5 can be enhanced, and the effects of improving the fuel consumption and suppressing the amount of blow-by gas can be maintained for a longer period. On the other hand, when the Al content is 50 at % or less, Al is sufficiently dissolved in chromium nitride, and the uniform coating 5 can be obtained. Further, chromium nitride containing Al within the above range has excellent wear resistance. Therefore, a sliding surface is made of this chromium nitride, the effects of improving the fuel consumption and suppressing the amount of blow-by gas can be maintained for a longer period. A lower limit value of the Al content may be 13 at % or 15 at %. An upper limit value of the Al content may be 25 at % or 20 at %.

The thermal resistance value of the coating 5 is $2.0\times10^{-6}$ $m^2\cdot K/W$ or more, preferably $2.5\times10^{-6}$ $m^2\cdot K/W$ or more, more preferably $4.0\times10^{-6}$ $m^2\cdot K/W$ or more, still more preferably $5.0\times10^{-6}$ $m^2\cdot K/W$ or more, and most preferably $7.0\times10^{-6}$ $m^2\cdot K/W$ or more. When the thermal resistance value of the coating 5 is $2.0\times10^{-6}$ $m^2\cdot K/W$ or more, appropriate thermal insulation performance can be imparted to the piston ring 10, and the temperature of the piston ring base material 1 can be sufficiently increased when the engine is driven. As a result, the gap of the joint portion 11 is reduced, and the amount of blow-by gas can be suppressed. In addition, since the piston ring 10 has the thermal insulation performance, a decrease in the temperature of the combustion chamber can be suppressed. That is, the engine that can suppress the amount of blow-by gas and has good fuel consumption characteristics is achieved since the piston ring 10 has the appropriate thermal insulation performance.

The thermal resistance value of the coating 5 is $12.0\times10^{-6}$ or less, preferably $11.0\times10^{-6}$ $m^2\cdot K/W$ or less, more preferably $10.3\times10^{-6}$ $m^2\cdot K/W$ or less, and still more preferably $9.0\times10^{-6}$ $m^2\cdot K/W$ or less. When the thermal resistance value of the coating 5 is $12.0\times10^{-6}$ $m^2\cdot K/W$ or less, excessive thermal insulation performance of the piston ring 10 can be prevented. Therefore, it is possible to prevent in advance problems that may occur when the piston ring 10 is overheated. Such problems include the heat deformation of the piston ring base material 1 and agglutination of the piston ring 10 to the piston.

The "thermal resistance value" as used herein means a value obtained by a laser heat reflection method. In the laser heat reflection method, thermal diffusivity is obtained by forming a molybdenum (Mo) film on a surface of a sample in a mirror surface condition and analyzing modulation of reflectance on a metal surface when such a thin film surface is periodically heated by laser irradiation. More specifically, first, the sample surface is periodically heated by laser light, and heat is diffused from the surface of the metal thin film into the sample. At this time, the temperature of the sample surface changes according to the thermal conductivity of the sample. Here, continuous wave laser light for detection, which is not coaxially modulated with heating light, is emitted using the property of Mo that the reflectance changes depending on the temperature, thereby obtaining reflected light corresponding to temperature modulation of the sample surface. In the case of the sample in which thermal diffusion is fast and the temperature changes following a cycle of the heating light, a phase delay of the reflected light with respect to the heating cycle becomes small. On the other hand, in the case of the sample in which thermal diffusion is slow and the temperature changes with a lag behind the cycle of the heating light, the phase delay of the reflected light with respect to the heating cycle becomes large. The thermal diffusivity of the sample is obtained by analyzing the phase delay of the reflected light with respect to the heating light. A value of the thermal diffusivity and a specific heat value obtained by differential scanning calorimetry are applied to Formula 1 to calculate the thermal resistance value.

Note that the thermal resistance value may be obtained by a method other than the laser heat reflection method as long as it can be confirmed that a value equivalent to the thermal resistance value measured by the laser heat reflection method can be obtained or that there is a correlation with the thermal resistance value measured by the laser heat reflection method. For example, thermal diffusivity and specific heat may be obtained by a laser flash method, and these may be applied to Formula 1 to calculate the thermal resistance value. In the laser flash method, a disk-shaped sample held in a vacuum is irradiated with pulsed laser light for heating, and a temperature history of a back surface of the sample is analyzed to determine the thermal diffusivity and the specific heat. More specifically, first, the disk-shaped sample is placed in a vacuum, and the entire sample is held at a constant temperature $T_0$. Next, the entire front surface of the sample is pulse-heated by laser light having a pulse width of about 100 μs, and a temperature change of the back surface is measured. At this time, since the front surface of the sample is uniformly heated, heat is one-dimensionally diffused from the front surface toward the back surface, and the temperature finally becomes uniform. Therefore, the thermal diffusivity is obtained by applying a time $t_{half}$ required for the entire sample to reach half the uniform temperature and a thickness L of the sample to Formula 3. Similarly, the specific heat is obtained by applying a weight $W_s$ and a final reaching temperature $T_s$ of the sample, and specific heat $C_{p,r}$, a weight $W_r$, and a final reaching temperature $T_r$ of a reference substance to Formula 4.

$$\text{Thermal diffusivity} = 0.1388 \times L^2/t_{half} \quad \text{(Formula 3)}$$

$$\text{Specific heat} = C_{p,r} \times W_r \times (T_r - T_0)/(W_s \times (T_s - T_0)) \quad \text{(Formula 4)}$$

<Method of Manufacturing Piston Ring>

The piston ring 10 is manufactured by, for example, the following steps.

(a) A step of cleaning the surface of the piston ring base material 1.

(b) A step of forming the intermediate layer 3 to cover at least the outer peripheral surface of the piston ring base material 1.

(c) A step of forming the coating 5 on the surface of the intermediate layer 3.

The step (a) is a step for bringing the surface of the piston ring base material 1 into a clean state prior to the formation of the intermediate layer 3. For example, it is sufficient to perform a cleaning treatment by degreasing or shot blasting. In addition, bombardment cleaning may be performed in a chamber.

The formation of the intermediate layer 3 and the coating 5 in the step (b) and the step (c) can be performed by a physical vapor deposition method. Examples of the physical vapor deposition method include an ion plating method and a sputtering method. All of these physical vapor deposition methods are performed in a vacuum chamber, and for example, the pressure in the vacuum chamber is set to a range of 1 to 6 Pa. Further, a bias voltage is set in a range of −1 to 18 V, for example.

Compositions of the intermediate layer 3 and the coating 5 can be changed by changing a target used in the physical vapor deposition method. As the target, for example, an alloy of Si or Al and Cr, a Cr ingot, or the like may be used. After the chamber is brought into a vacuum atmosphere, for example, the vacuum atmosphere is replaced with an inert gas such as argon gas of $1.0\times10^{-3}$ Pa, whereby the intermediate layer 3 and the coating 5 containing only atoms derived from a cathode can be formed. Alternatively, a gas containing any of oxygen, nitrogen, and hydrogen, for example, is introduced into the chamber, whereby the intermediate layer 3 and the coating 5 containing the respective atoms can be formed. In the formation of the intermediate layer 3 and the coating 5, a common target may be used to change a gas to be introduced into the chamber. As a result, the intermediate layer 3 and the coating 5 having good adhesion can be obtained, and manufacturing cost of the piston ring 10 can be reduced.

Figure 3:
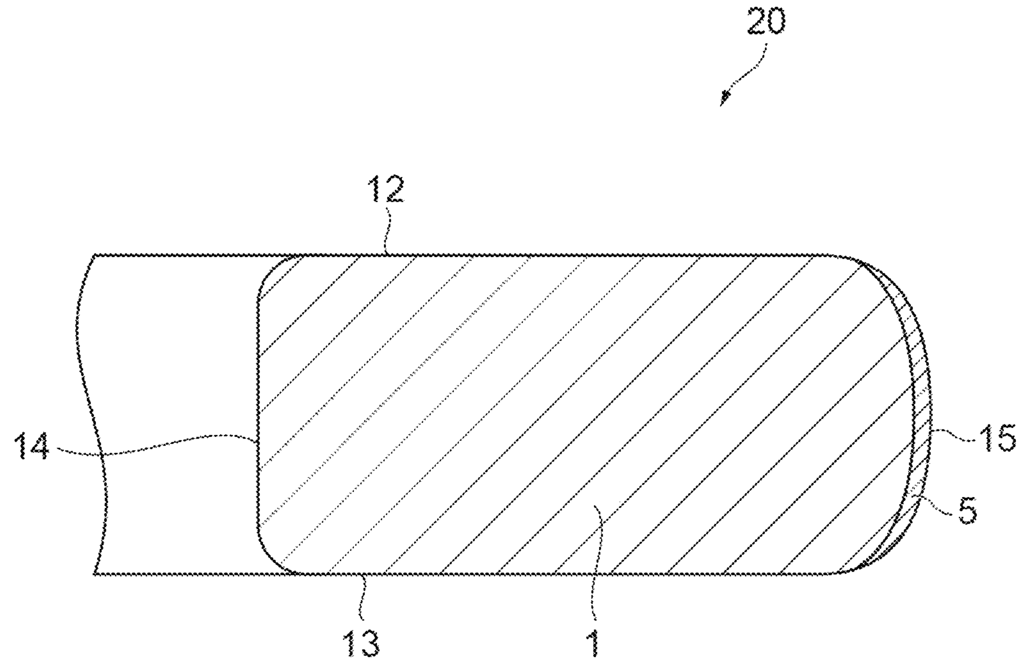
FIG. 3 is a cross-sectional view schematically illustrating another embodiment of the piston ring according to the present disclosure.

Although the embodiment of the present disclosure has been described above, the present disclosure is not limited to the above-described embodiment. Although the piston ring 10 including the intermediate layer 3 is exemplified in the above embodiment, the intermediate layer 3 is not necessarily provided as long as the adhesion of the coating 5 to the piston ring base material 1 can be sufficiently secured. In a piston ring 20 illustrated in FIG. 3, the coating 5 is directly formed on an outer peripheral surface of the piston ring base material 1. Note that one having at least an outer peripheral surface subjected to a surface treatment may be used as the piston ring base material 1. The present disclosure relates to the following matters.

[1]

A piston ring including:

a piston ring base material having a joint portion; and a coating covering at least an outer peripheral surface of the piston ring base material, wherein a thermal resistance value of the coating is $2.0\times10^{-6}$ to $12.0\times10^{-6}$ m$^2$·K/W.

[2]

The piston ring according to [1], wherein the coating contains Al or Si.

[3]

The piston ring according to [1] or [2], further including an intermediate layer formed on a surface of the piston ring base material, wherein the coating is formed on a surface of the intermediate layer.

[4]

The piston ring according to [3], wherein the intermediate layer contains Al or Si.

[5]

The piston ring according to [3] or [4], wherein the coating is made of chromium nitride containing Si, and the intermediate layer is made of chromium containing Si.

[6]

The piston ring according to any one of [3] to [5], wherein the coating is made of chromium nitride containing Al, and the intermediate layer is made of chromium containing Al.

EXAMPLES

Hereinafter, the present disclosure will be described in more detail based on Examples. Note that the present invention is not limited to the following Examples.

As a piston ring base material, a ring having the following composition corresponding to SUS440 and having a joint gap of 0.40 mm was prepared.

Fe: 80.4% by mass

C: 0.85% by mass

Cr: 17.0% by mass

Si: 0.5% by mass

Mn: 0.5% by mass

Other elements: rest

Comparative Example 1

A surface of a piston ring base material was subjected to a nitriding treatment under the following conditions to form a nitride layer. That is, first, the piston ring base material was degreased and cleaned, and then placed in a chamber. Subsequently, an ammonia gas was added into the chamber by a gas nitriding method, and the nitriding treatment was performed under conditions of a nitriding temperature of 570° C. and a treatment time of two hours. A thickness of the nitride layer was 60 μm.

Examples 1 to 4 and Comparative Examples 2 to 4

Piston rings according to Experimental Examples 1 to 4 and Comparative Examples 2 to 4 were prepared through the following three steps. Note that a film formation time in each step was appropriately adjusted according to a target thermal resistance value of a coating or a film thickness of an intermediate layer.

(a) A Step of Cleaning a Surface of a Base Material

First, a piston ring base material was degreased and cleaned, and then placed in a chamber. Subsequently, the inside of the chamber was brought into a vacuum atmosphere of $1.0\times10^{-2}$ Pa, and then the inside of the chamber was replaced with an argon gas to set an argon pressure to 1.0 Pa. Then, the piston ring base material was subjected to bombardment cleaning by glow discharge under a condition of a bias voltage of −700 V.

(b-1) a Step of Forming the Intermediate Layer by an Ion Plating Method

In Examples 2 to 4 and Comparative Examples 3 and 4, the intermediate layer was formed on an outer peripheral surface of the cleaned piston ring base material by a chamber ion plating method under the following conditions.

(Film Formation Conditions)

Arc current: 150 A
Bias voltage: −10 V
Film formation temperature: 500° C.
Atmosphere: Argon gas, $1.0\times10^{-1}$ Pa
Target: Chromium In Example 1 and Comparative Example 2, the step of forming the intermediate layer was not performed.

(c-1) a Step of Forming the Coating by an Ion Plating Method

In Example 1 and Comparative Example 2, the coating was formed on a surface of the piston ring base material by a chamber ion plating method under the following conditions. In Examples 2 to 4 and Comparative Examples 3 and 4, the coating was formed on the surface on which the intermediate layer was formed by a chamber ion plating method under the following conditions.

(Film Formation Conditions)

Arc current: 150 A
Bias voltage: −10 V
Film formation temperature: 500° C.
Atmosphere: Nitrogen gas, 4.0 Pa·
Target: Chromium

Examples 5 and 6

Piston rings according to Examples 5 and 6 were prepared in the same manner as in Example 2 except that the following step (c-2) was performed instead of the step (c-1).

(c-2) a Step of Forming a Coating in which Two Kinds of Layers are Laminated by an Ion Plating Method In film formation by the ion plating method, CrN(C) and CrN were alternately used so as to be deposited circumferentially. A film formation time was adjusted such that a lamination ratio of CrN(C) and CrN was 1:2.

Examples 7 and 8 and Comparative Examples 7 and 8

Piston rings according to Examples 7 and 8 and Comparative Examples 7 and 8 were prepared in the same manner as in Example 2 except that film formation was performed under the following conditions in the step (c-1).

(Film Formation Conditions)

Arc current: 70 A
Bias voltage: 0 V
Atmosphere in chamber: Argon gas, $1.0\times10^{-3}$ Pa·
Film formation temperature: 300° C.
Target: Carbon

Examples 9 and 10 and Comparative Examples 9 and 10

Piston rings according to Examples 9 and 10 and Comparative Examples 9 and 10 were prepared in the same manner as in Example 7 except that an atmosphere in a chamber was an acetylene gas under $1.0\times10^{-1}$ Pa in the step (c-1).

Example 11

A piston ring according to Example 11 was prepared in the same manner as in Example 1 except that a Cr—Al alloy (Al content: 50 at %) was used as a target in the step (c-1).

Examples 12 and 13

Piston rings according to Examples 12 and 13 were prepared in the same manner as in Example 2 except that a Cr—Al alloy (Al content: 50 at %) was used as a target in the steps (b-1) and (c-1).

Example 14

A piston ring according to Example 14 was prepared in the same manner as in Example 1 except that a Cr—Si alloy (Si content: 10 at %) was used as a target in the step (c-1).

Examples 15 to 17 and Comparative Examples 5 and 6

Piston rings according to Examples 15 to 17 and Comparative Examples 5 and 6 were prepared in the same manner as in Example 2 except that a Cr—Si alloy (Si content: 10 at %) was used as a target in the steps (b-1) and (c-1).

(Calculation of Thermal Resistance Value)

Thermal resistance values of the coatings of the piston rings according to Example 1 to 17 and Comparative Example 1 to 10 were calculated by applying the film thickness, specific gravity, specific heat, and thermal diffusivity measured by a method described later to Formula 1. The obtained thermal resistance values are shown in Table 1.

The film thickness of the coating was measured by observing a cross section by the following method. That is, first, the piston ring was cut in a direction perpendicular to a coated surface, and embedded in a resin such that a cut surface was exposed. Next, a surface where the cut surface was exposed was wet-polished with water-resistant polishing paper, and then, finish polishing was performed using a diamond film #8000 to obtain a sample for cross-section observation. Then, a surface of the obtained sample was magnified and observed using an optical microscope to measure the film thickness of the coating.

The specific gravity of the coating was calculated from a volume obtained from the film thickness of the coating and the area of a surface-treated surface of the piston ring, and a weight change of the piston ring before and after a coating formation treatment.

The specific heat of the coating was measured using differential scanning calorimetry (device name: DSC-50, manufactured by Shimadzu Corporation). The measurement was performed on the piston ring under conditions in accordance with JIS R1672:2006 using, as a sample, a thin film prepared under the same conditions as those of the coating.

The thermal diffusivity of the coating was measured by a laser heat reflection method with a measurement sample prepared by the following method. That is, first, the piston ring was cut in a direction perpendicular to a coated surface, and embedded in a resin so as to expose a cut surface.

Subsequently, a surface (measurement surface) where the cut surface was exposed was wet-polished with water-resistant abrasive paper, and then finish polishing was performed using a diamond film #8000 to polish the piston ring until the cut surface became a mirror surface. Furthermore, a 50 nm Mo film was produced on the measurement surface by a sputtering method. Then, the resin was cut into small pieces using a fine cutter, and then, the measurement surface was machined to be 10 mm×10 mm or less with a height of 3 mm or less using a plane grinding machine to obtain a measurement sample for laser heat reflection measurement.

The thermal diffusivity of the obtained measurement sample was measured by a laser heat reflection method. The measurement was performed under the following conditions using a thermophysical property microscope (device name: Thermal microscope TM3, manufactured by BETHEL Co., Ltd.). Note that a measurement position was set such that an outer peripheral surface of the coating and the piston ring base material were within a measurement range, and an average value obtained by performing the measurement thirty times was taken as a measurement result.

Measurement Conditions

Heating laser shape: Elliptical shape of 28 μm×25 μm
Heating laser wavelength: 808 nm
Modulation frequency: 1 MHz modulation frequency
Detection laser shape: Circular shape with a diameter of 3 μm
Detection laser wavelength: 658 nm
Measurement range: Width 120 μm×Depth 60 μm
Inter-measurement pitch: 2 μm (Measurement of Blow-by Gas)

As an internal combustion engine to which the piston rings are applied, an engine having the following performance was prepared.

Bore diameter: φ120 mm
Displacement: 10 L
Fuel: Diesel

Figure 4:
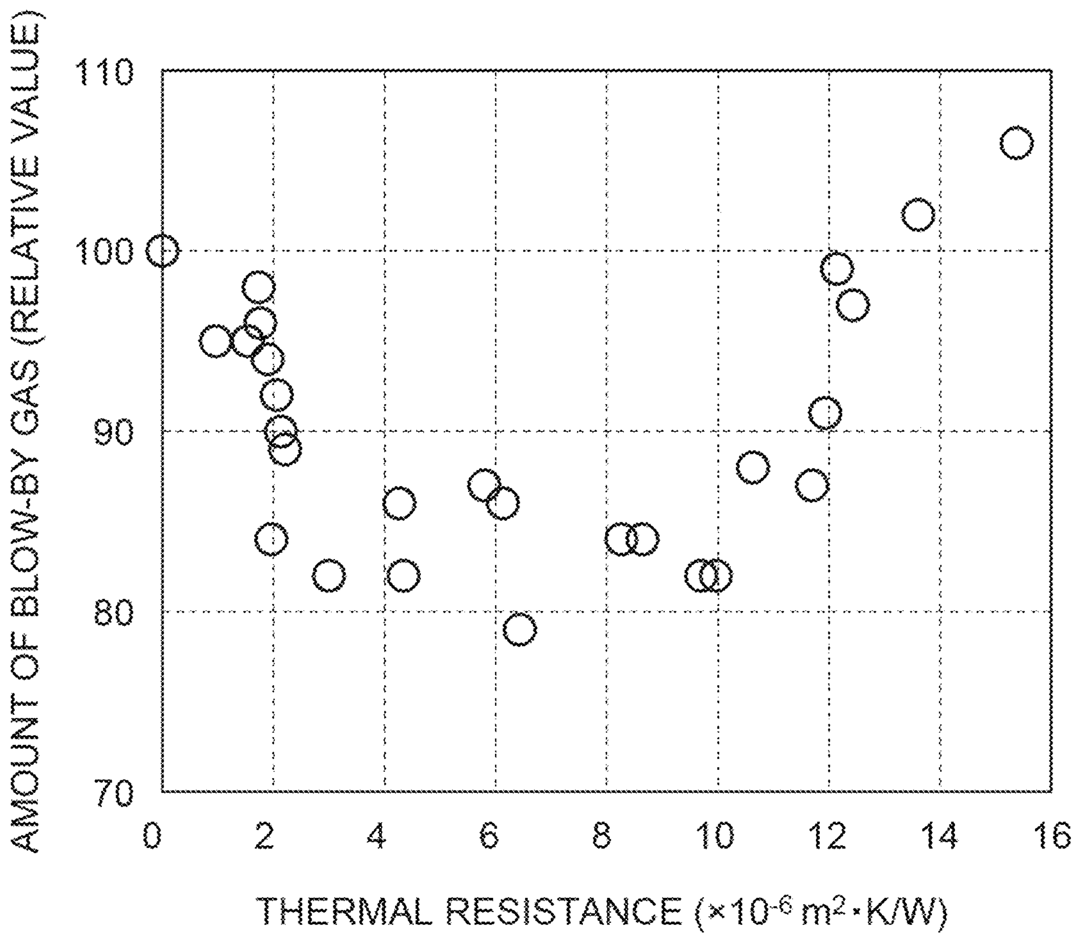
FIG. 4 is a graph showing results of Examples and Comparative Examples.

The piston rings according to Example 1 to 17 and Comparative Example 1 to 10 were attached to the engine, and the amount of blow-by gas was measured when the engine was operated under the following conditions. Table 1 and FIG. 4 show relative values of the amount of blow-by gas in each of Examples and Comparative Examples when the amount of blow-by gas in Comparative Example 1 is 100.

Engine speed: 2000 rpm
Cooling water temperature: 90° C.
Oil temperature: 100° C.

TABLE 1

| | Coating | | | |
|---|---|---|---|---|
| | Intermediate Layer Material | Material | Thermal Resistance ($10^{-6}$ $m^2 \cdot K/W$) | Amount of Blow-by Gas (Relative Value) |
| Example 1 | — | CrN | 5.8 | 87 |
| Example 2 | Cr | CrN | 6.1 | 86 |
| Example 3 | Cr | CrN | 2.1 | 92 |
| Example 4 | Cr | CrN | 11.9 | 91 |
| Example 5 | Cr | CrN(C)/CrN Laminate | 2.1 | 90 |
| Example 6 | Cr | CrN(C)/CrN Laminate | 4.3 | 86 |
| Example 7 | Ct | DLC(ta-C) | 8.3 | 84 |
| Example 8 | Cr | DLC(ta-C) | 2.2 | 89 |
| Example 9 | Cr | DLC(a-C:H) | 10.6 | 88 |
| Example 10 | Cr | DLC(a-C:H) | 8.6 | 84 |
| Example 11 | — | CrN(Al) | 9.7 | 82 |
| Example 12 | Cr—Al | CrN(Al) | 3.0 | 82 |
| Example 13 | Cr—Al | CrN(Al) | 11.7 | 87 |
| Example 14 | — | CrN(Si) | 4.3 | 82 |
| Example 15 | Cr—Si | CrN(Si) | 2.0 | 84 |
| Example 16 | Cr—Si | CrN(Si) | 6.4 | 79 |
| Example 17 | Cr—Si | CrN(Si) | 10.0 | 82 |
| Comparative Example 1 | — | Nitride | 0.0 | 100 |
| Comparative Example 2 | — | CrN | 1.9 | 94 |
| Comparative Example 3 | Cr | CrN | 1.5 | 95 |
| Comparative Example 4 | Cr | CrN | 13.6 | 102 |
| Comparative Example 5 | Cr—Si | CrN(Si) | 1.0 | 95 |
| Comparative Example 6 | Cr—Si | CrN(Si) | 12.1 | 99 |
| Comparative Example 7 | Cr | DLC(ta-C) | 1.7 | 98 |
| Comparative Example 8 | Cr | DLC(ta-C) | 12.4 | 97 |
| Comparative Example 9 | Cr | DLC(a-C:H) | 1.8 | 96 |
| Comparative Example 10 | Cr | DLC(a-C:H) | 15.4 | 106 |

In Examples 1 to 10, a decrease in the blow-by gas was observed as compared with Comparative Example 1. In Examples 1 to 10, the fuel consumption tended to be improved as the thermal resistance value increased. In Examples 11 to 17, a more remarkable decrease in the blow-by gas was observed as compared with Examples 1 to 10 having similar thermal resistance values. The reason why the amount of blow-by gas was large in Comparative Examples 4, 6, 8, and 10 is presumed that heat deformation of the piston ring occurred because thermal resistance of the coating was large.

REFERENCE SIGNS LIST

1 PISTON RING BASE MATERIAL
3 INTERMEDIATE LAYER
5 COATING
10, 20 PISTON RING
11 JOINT PORTION
12, 13 SIDE SURFACE
14 INNER PERIPHERAL SURFACE
15 OUTER PERIPHERAL SURFACE.

The invention claimed is:

1. A piston ring for an internal combustion engine including a cylinder with a cylinder liner, the piston ring comprising:

a piston ring base material comprising a joint portion; and a coating covering at least an outer peripheral surface of the piston ring base material, wherein the coating defines at least an outermost peripheral surface of the piston ring, wherein the coating comprises chromium nitride and is configured to have a thermal resistance value of 4.0×

$10^{-6}$ to $12.0\times10^{-6}$ $m^2\cdot K/W$ sufficient to reduce the amount of blow-by gas in the internal combustion engine, and wherein the coating comes into sliding contact with the cylinder liner when in use within the internal combustion engine.

2. The piston ring according to claim 1, wherein the coating contains Al or Si.

3. The piston ring according to claim 1, further comprising an intermediate layer provided between the piston ring base material and the coating, wherein the intermediate layer is formed on a surface of the piston ring base material, and the coating is formed on a surface of the intermediate layer.

4. The piston ring according to claim 3, wherein the intermediate layer contains Al or Si.

5. The piston ring according to claim 3, wherein the coating is made of chromium nitride containing Si, and the intermediate layer is made of chromium containing Si.

6. The piston ring according to claim 3, wherein the coating is made of chromium nitride containing Al, and the intermediate layer is made of chromium containing Al.

7. The piston ring according to claim 1, wherein the coating is made of chromium nitride containing Si and consisting of crystal grains, or is made of chromium nitride in which an amorphous phase is formed.

8. The piston ring according to claim 1, wherein the coating is made of chromium nitride containing Al, and does not contain Ti.

9. The piston ring according to claim 1, wherein the thermal resistance value of the coating is $5.0\times10^{-6}$ $m^2\cdot K/W$ or more.

10. The piston ring according to claim 1, wherein the thermal resistance value of the coating is $7.0\times10^{-6}$ $m^2\cdot K/W$ or more.

11. The piston ring according to claim 1, wherein the thermal resistance value of the coating is $11.0\times10^{-6}$ $m^2\cdot K/W$ or less.

12. The piston ring according to claim 1, wherein the thermal resistance value of the coating is $10.3\times10^{-6}$ $m^2\cdot K/W$ or less.

13. The piston ring according to claim 1, wherein the thermal resistance value of the coating is $9.0\times10^{-6}$ $m^2\cdot K/W$ or less.

* * * * *